US005572348A

United States Patent [19]
Carlson et al.

[11] Patent Number: 5,572,348
[45] Date of Patent: Nov. 5, 1996

[54] UNIVERSAL DEMARCATION POINT

[76] Inventors: Jeffrey A. Carlson, Hwy. #2E, Shevlin, Minn. 56676; Craig D. Mead, 753 Center St., Cleveland, N.Y. 13042

[21] Appl. No.: 386,474

[22] Filed: Feb. 9, 1995

[51] Int. Cl.⁶ .................................................. H04J 14/02
[52] U.S. Cl. ...................... 359/125; 359/163; 359/173; 439/535; 439/49; 348/6; 455/3.3; 379/399
[58] Field of Search ............................. 359/125, 137, 359/163, 171, 173; 379/110, 399; 439/49, 535; 385/135; 348/6, 10; 455/3.3, 6.3

[56] References Cited

U.S. PATENT DOCUMENTS

| | | | |
|---|---|---|---|
| 3,614,538 | 10/1971 | Nickola | 317/99 |
| 4,673,771 | 6/1987 | Grant | 174/38 |
| 4,785,376 | 11/1988 | Dively | 361/334 |
| 4,862,493 | 8/1989 | Venkataraman et al. | 379/107 |
| 4,979,209 | 12/1990 | Collins et al. | 379/399 |
| 5,095,403 | 3/1992 | Pin et al. | 361/356 |
| 5,134,541 | 7/1992 | Frouin | 361/334 |
| 5,243,338 | 9/1993 | Brennan, Jr. et al. | 340/870.02 |
| 5,337,400 | 8/1994 | Morin et al. | 439/49 |
| 5,355,401 | 10/1994 | Skinner, Sr. | 359/171 |
| 5,394,466 | 2/1995 | Schneider et al. | 379/399 |
| 5,419,716 | 5/1995 | Sciammarella et al. | 439/535 |

OTHER PUBLICATIONS

Shapiro, Mitch, *Agressive Fiber Depolyments Tie Up Western Cable Show*, Lightwave, pp. 6, 8 (Jan. 1994).
Kotelly, George, *AT&T Connects Three Field Trials*, Lightwave, pp. 1, 18 (Mar. 1994).
Wilson, Dave, *Fiber Outplays Copper on Interactive Digital TV*, Lightwave, pp. 8, 10 (May 1994).
Anderson, Verne, *A Match Made in Heaven*, America's Network, pp. 60–63 (Oct. 15, 1994).

*Primary Examiner*—Wellington Chin
*Assistant Examiner*—Kinfe-Michael Negash
*Attorney, Agent, or Firm*—Kinney & Lange, P.A.

[57] ABSTRACT

A universal demarcation point for managing the delivery of communications services to a subscriber that provides an interface between a utility distribution network and subscriber owned equipment. The universal demarcation point includes a utility accessible portion and a subscriber accessible portion. The utility accessible portion has an input port, an output port, a plurality of modular connectors, a power supply, and a plurality of service modules. The input port provides access to the universal demarcation point for delivery of communications service from the utility distribution network. The communications services are delivered through a hybrid cable. The hybrid cable has a plurality of fiber optic cables and a plurality of copper cables. The fiber optic cables are capable of transmitting light signals and the copper cables are capable of transmitting electric power. The output port provides access for delivering the communications services from the universal demarcation point into the subscriber's dwelling. The plurality of connectors are fixedly mounted to the universal demarcation point. The power supply is removably mounted to the universal demarcation point. The power supply converts the electric power into a voltage for powering the operation of the universal demarcation point. The service modules are capable of plugging into the modular connectors and convert the light signals that are transmitted on the fiber optic cables onto cables that are suitable for use in the subscriber's dwelling. The subscriber accessible portion is adjacent to the utility accessible portion and has ports that enable the subscriber to test the integrity of the communications services delivered from the utility distribution network.

21 Claims, 7 Drawing Sheets

UNIVERSAL DEMARCATION POINT

BACKGROUND OF THE INVENTION

The present invention relates to a device that facilitates the delivery of communications services to subscribers. More particularly, the present invention relates to a universal demarcation point that provides an interface between a utility distribution network and subscriber owned equipment for use with the delivery of communication services to subscribers via fiber optic and copper cables.

When delivering communications services to subscribers, it is common for a utility to attach a service box to the subscriber's dwelling. The service box provides an interface between the utility distribution network and subscriber owned equipment. As used herein, the term "subscriber owned equipment" means equipment that a subscriber attaches either directly or indirectly to a utility distribution network to receive or transmit communications services through the utility distribution network. Examples of subscriber owned equipment include telephones, television, and modems.

When the subscriber subscribes to multiple types of communications services, the utility mounts a separate service box to the subscriber's dwelling for each type of communications service. Each of the separate service boxes is then connected to the appropriate utility distribution network. For example, the telephone service box is connected to the telephone distribution network and the cable television service box is connected to the cable television distribution network.

When the utility provides communications services in rural areas where there may be several miles between each subscriber, the utility must install separate copper wires to each service box on each subscriber's dwelling. In addition, when communications services are transmitted over long distances using certain types of copper wires, the electrical signals weaken and become distorted. To overcome these drawbacks, the utility must install amplifiers or repeaters at regular intervals in the utility distribution network so that the utility can provide the subscriber with a desirable quality of communications services. As a result of the costs associated with serving subscribers in rural areas, the utilities have been restricted in their ability to provide subscribers with a range of communications services that utilities are typically able to provide for subscribers in urban areas.

There are various designs for service boxes. One such design is described in Grant, U.S. Pat. No. 4,673,771. The Grant patent discloses a universal building entrance terminal for telephone service. The terminal is primarily designed for attachment to commercial buildings where it is necessary to gain access to the terminal blocks for adding, deleting or changing subscribers' telephone lines. The terminal has a modular construction that allows components in the terminal to be accessed and changed.

Several service box designs include the ability to deliver more than one type of utility service. For example, Nickola, U.S. Pat. No. 3,614,538, discloses a pedestal, which is mounted adjacent to a mobile home, for delivering electric power, telephone service, and gas service to the mobile home. Conventional electric and gas meters, as well as a conventional telephone box, can be mounted to the post so that the utilities can be readily connected and disconnected to the mobile home.

Dively, U.S. Pat. No. 4,785,376, discloses a utility pedestal that is primarily designed for use in marinas. The pedestal allows for delivery of electric, telephone, television, and water service to a single point. The pedestal also contains connectors that enable the utility services to be conveniently connected and disconnected to a boat or vehicle.

Horn, U.S. Pat. No. 5,196,988, and Horn, U.S. Pat. No. 5,184,279, disclose an adapter faceplate for use in a metal power pedestal. The adapter provides the ability to add telephone and television capabilities to the power pedestal. The adapter isolates the telephone and television cables from the electrical components in the pedestal.

Frouin, U.S. Pat. No. 5,134,541, discloses a distribution system for water, gas, fuel, electricity, and other fluids. The system is enclosed in a container that resists vandalism and accepts payment for disbursement of the utility services.

SUMMARY OF THE INVENTION

The present invention includes a universal demarcation point for managing the delivery of communications services to a subscriber. The universal demarcation point provides an interface between a utility distribution network and subscriber owned equipment.

The universal demarcation point includes a utility accessible portion and a subscriber accessible portion. The utility accessible portion has an input port, an output port, a plurality of modular connectors, a power supply, and a plurality of service modules.

The input port allows a hybrid cable from the utility distribution network to pass into the universal demarcation point. The hybrid cable has a plurality of fiber optic cables and a plurality of copper cables. The fiber optic cables are capable of transmitting light signals and the copper cables are capable of transmitting electric power. The output port delivers the communications services from the universal demarcation point into the subscriber's dwelling.

The plurality of modular connectors are fixedly mounted to the universal demarcation point. The power supply, which is removably mounted to the universal demarcation point, converts the electric power into a voltage for powering the operation of the universal demarcation point. The plurality of service modules plug into the modular connectors and converts light signals that are transmitted on the fiber optic cables onto cables that are suitable for use in the subscriber's dwelling.

The subscriber accessible portion is adjacent to the utility accessible portion and has ports that enable the subscriber to test the integrity of the communications services delivered from the utility distribution network.

DETAILED DESCRIPTION OF THE PREFERRED EMBODIMENTS

Figure 1:
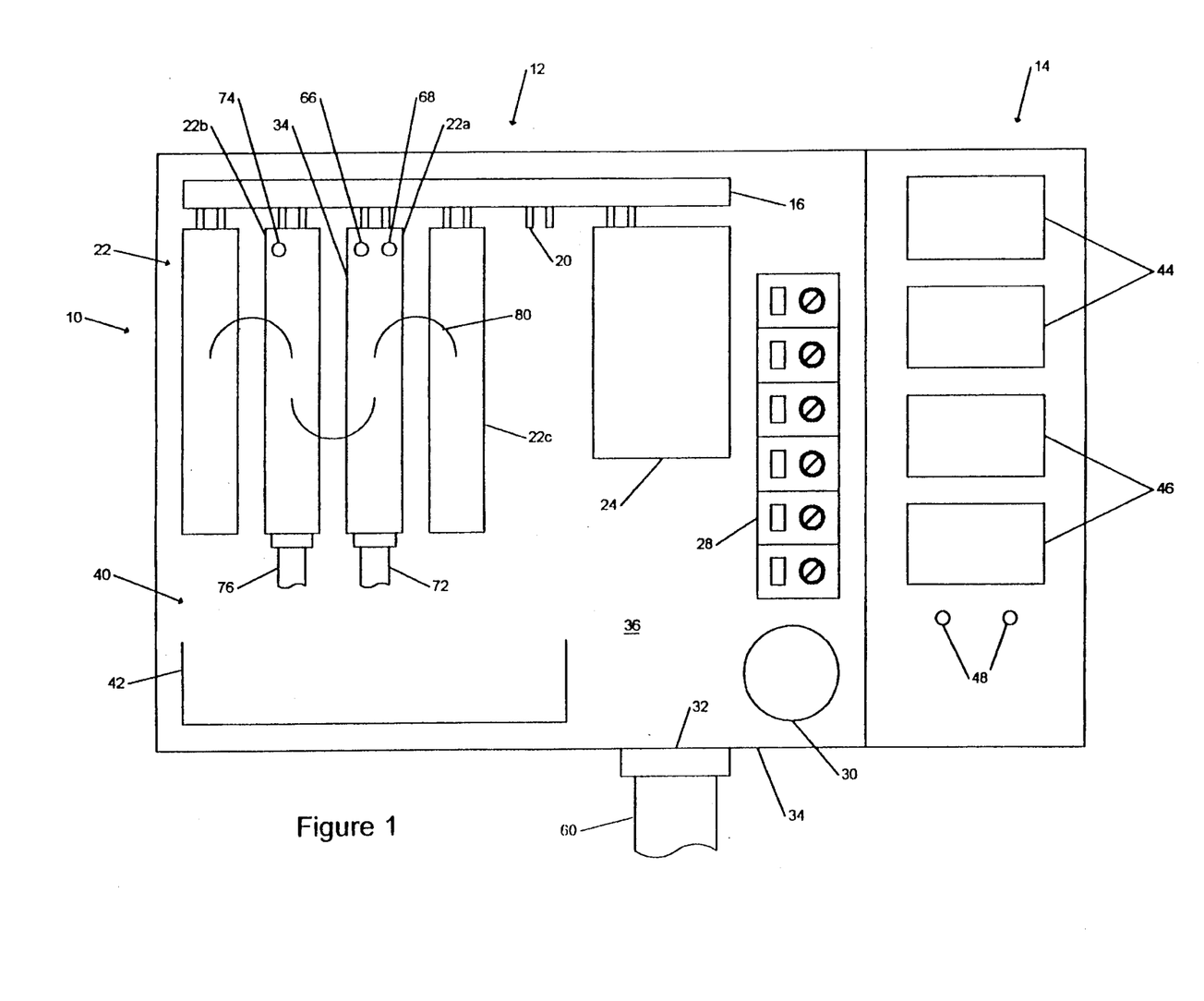
FIG. 1 is a plan view of the universal demarcation point of the present invention.

The present invention includes a universal demarcation point, which is illustrated at 10 in FIG. 1. The universal demarcation point 10 provides an interface between a utility distribution network and subscriber owned equipment for managing the delivery of communications services to subscribers.

The universal demarcation point 10 is particularly suited for managing the delivery of audio, video, and computer data services over fiber optic cables and copper cables to subscribers in rural areas. The universal demarcation point 10 provides a single interface for delivering the audio, video, and computer data services to subscribers. As a result, the utility only needs to install one hybrid cable to connect each subscriber to the utility distribution network. Installing only a single hybrid cable to each subscriber in rural areas also allows the utility to reduce the costs that are associated with maintaining several separately installed cables that run to each subscriber.

Because of the cost associated with transmitting electrical signals over long distances to sparsely populated areas, utilities serving subscribers in rural settings are limited in their ability to deliver a variety of communications services to its subscribers. However, by delivering various communications services to subscribers through a single interface, the universal demarcation point 10 allows audio, video, and computer data services to be transmitted on a single fiber optic cable or in a single bundle of fiber optic cables.

The fiber optic cables have a greater bandwidth than conventional twisted pair cables. As a result, the fiber optic cables are capable of handling more information than twisted pair copper cables or coaxial cables. Because the fiber optic cables are capable of handling a greater throughput of information, it is possible to simultaneously transmit more than one type of signal, such as audio and video signals, on a single fiber optic cable.

Fiber optic cables also do not require the frequent use of amplifiers or repeaters that are required when communications services are transmitted over twisted pair copper cables or coaxial cables. As a result, transmission of the audio, video, and computer data services over the fiber optic cables allows the quality of the communications services to be improved while lowering the cost of transmitting the communications services.

Utilities that serve urban areas where there are greater densities of subscribers have found that they can reap the benefits of transmitting communications services with fiber optic cables in a cost effective manner by installing fiber optic cables to a central neighborhood location. From this point, the communications services are delivered to subscribers with twisted pair copper cables or coaxial cables.

However, the sparsely populated nature of rural areas makes it impractical to install fiber optic cables to either subscribers' dwellings or central neighborhood locations. The universal demarcation point, however, now provides a cost effective mechanism for delivering communications services to rural area subscribers with fiber optic cables.

The universal demarcation point 10 has a modular configuration that allows the universal demarcation point 10 to be modified to manage the delivery of any type of communication service that is provided by a utility. The modular configuration of the universal demarcation point 10 allows the universal demarcation point 10 to be installed with a limited number of components. When the subscriber requests additional services or the utility raises the capital to install the ability to provide additional services, the utility can readily modify the configuration of the universal demarcation point 10 by adding or changing components.

The universal demarcation point is generally divided into a utility accessible portion 12 and a subscriber accessible portion 14. The utility accessible portion 12 includes a motherboard 16. The motherboard 16 has a plurality of connectors 20 for attaching components to the universal demarcation point 10.

The connectors 20 are preferably a plurality of modular edgeboard connectors 20. Each of the modular edgeboard connectors 20 is adapted to receive a complementarily shaped end portion of a service module 22. The modular edgeboard connectors 20 retain the service modules 22 in a desired position in the universal demarcation point 10 while allowing the service modules 22 to be readily removed from the universal demarcation point 10. Modular edgeboard connectors 20 possessing the above characteristics can be obtained from EDAC Systems Inc. (Colmar, Pa.), Texas Instruments, Inc. (Houston, Tex.) and Sullins Electronics Corporation (San Marcos, Calif.).

The end portion of the service module that is shaped complementary to the modular edgeboard connectors 20 preferably includes conductive traces. The motherboard 16 preferably also includes conductive traces or wires (not shown) for delivering electrical power from a power supply 24 to the modular edgeboard connectors 20 so that the modular edgeboard connectors 20 can transmit the electrical power to the service modules 22 that are plugged into the modular edgeboard connectors 20.

The operation of the universal demarcation point 10 is entirely powered by electric power from the utility distribution network. Local power from the subscriber is not required to operate any of the components in the universal demarcation point 10. The ability of the utility to provide telephone service without the use of local power is one of the design requirements for rural utilities to obtain loans from the Rural Electrification Administration under the State Telecommunications Modernization Plan. 58 Fed. Reg. 66,259 (1993).

The universal demarcation point 10 includes a power supply 24 that is removably mounted in the utility accessible portion 12. The power supply 24 converts the electric power from a transmission voltage that is transmitted through the utility distribution network to a usage voltage that is required to power the operation of the universal demarcation point 10. Power supplies that convert electric power at one voltage to electric power at a different voltage are known.

In one preferred embodiment, the power supply 24 converts the electric power from a transmission voltage of approximately −48 volts DC to a usage voltage of ±12 volts DC. The power supply 24 is preferably selected to exhibit a 10 second peak to peak surge rating at an RF (radio frequency) output of 400 volts. The power rating or capacity of the power supply 24 is selected based upon the number of service modules 22 that are used in the universal demarcation point 10. When four service modules 22 are used in the universal demarcation point 10, the power supply 24 is preferably selected with a 250 watt power rating.

The power supply 24 preferably plugs into the modular edgeboard connector 20 on the motherboard 16. The modular edgeboard connector 26 connects the power supply 24 to the conductive traces or wires (not shown) on the motherboard 16 while allowing the power supply 24 to be removed from the motherboard 16.

The utility accessible portion 12 has a fixedly mounted power terminal strip 28. The power terminal strip 28 provides connections for the copper cables that power the operation of the universal demarcation point 10. The power terminal strip 28 also provides connections for the twisted pair copper cables when the twisted pair copper cables are used to provide telephone service to the subscriber. For example, the utility may transmit the telephone service over twisted pair copper rather than fiber optic cables to reduce the initial cost of installing the universal demarcation point 10.

The utility accessible portion 12 includes an output port 30 and an input port 32. The output port 30 allows cables carrying the communications services to pass from the universal demarcation point 10 to the subscriber's dwelling. The input port 32 allows cables carrying the communications services from the utility distribution network to pass into the universal demarcation point 10. The output port 30 and the input port 32 are preferably positioned on a lower surface 34 or a back surface 36 of the universal demarcation point 10 to minimize problems associated with substances leaking into the universal demarcation point 10.

The utility accessible portion 12 preferably also includes a fiber optic cable management area 40 that is located adjacent to the service modules 22. The fiber optic cable management area 40 preferably has a tray 42 that is suitable for holding excess or unused portions of the fiber optic cables. The fiber optic cable management area 40 thereby helps to protect the fiber optic cables from damage.

The universal demarcation point 10 includes a cover (not shown) for the utility accessible portion 12. The cover protects the components inside the utility accessible portion 12 from damage that may arise from a variety of sources, such as vandalism or the environment. When the cover is in a closed position, the cover preferably creates a water-tight seal with the utility accessible portion 12. The cover preferably includes a locking mechanism (not shown) to prevent unauthorized access to the components inside the utility accessible portion 12.

The subscriber accessible portion 14 enables the subscriber to ascertain whether a problem with communications services is caused by a problem in the utility distribution network or the subscriber owned equipment. Such a device is commonly known as a network interface device. Preferably, the network interface device includes a test port for each of the communications lines that enter the subscriber's dwelling. For example, an RJ-11 plug and socket 44 are preferably provided for each telephone line and a coaxial plug and socket 46 are preferably provided for each video line.

Other types of devices can be used in the subscriber accessible portion 14 to ascertain whether there is a problem with the utility distribution network or the subscriber owned equipment. For example, the subscriber accessible portion 14 may include a sensor and an LED (light emitting diode) 48 to indicate if the communications signal drops below a threshold level.

Similar to the utility accessible portion 12, the subscriber accessible portion 14 includes a cover (not shown) that protects the test ports from damage that may result from a variety of sources, such as vandalism or the environment. When the cover is in a closed position, the subscriber portion cover preferably creates a water-tight seal with the subscriber accessible portion 14. The subscriber portion cover may also include a locking mechanism (not shown) to prevent unauthorized access to the components inside the subscriber accessible portion 14.

The service modules 22 are selected based upon the desired communications services that the utility is providing to the subscriber. The modular configuration of the universal demarcation point 10 allows the universal demarcation point 10 to receive either analog or digital signals from the utility distribution network and to transmit either analog or digital signals to the subscriber's dwelling for use on the subscriber owned equipment.

The modular configuration of the universal demarcation point 10 also allows the utility to modify the universal demarcation point 10 to deliver the communications services over different types of cables. For example, the video signal can be transmitted from the universal demarcation point 10 to the subscriber owned equipment using coaxial cable or fiber optic cable.

Preferably, the service modules 22 include an optical receiver service module 22a. The optical receiver service module 22a converts information transmitted as a light signal on the fiber optic cable into an electrical signal that is transmitted on a copper cable.

To convert the light signal into the electrical signal, the optical receiver service module 22a preferably includes a conventional PIN-FET (positive intrinsic negative-field effect transistor) photodetector (not shown). The PIN-FET photodetector produces an electrical signal that varies based upon the intensity and wavelength of light that strikes the photodetector. The PIN-FET photodetector preferably possesses the characteristics set forth in Table 1. A preferred PIN-FET photodetector can be obtained from Epitaxx Inc. (Trenton, N.J.) under the designation ETX700.

TABLE 1

| | |
|---|---|
| Optical Input Range | −10 to −1 dBm |
| Optical Wavelength | 1300 to 1550 nm ±20 nm |
| Optical Return Loss | 40 dB |
| Impedance | 75 Ohms |
| Return Loss | −15 dB |
| Bandwidth | 50 to 550 Mhz (min) |
| Frequency Response | ±1 dB |
| Input Voltage | 12 Volts DC |
| Current | 100 Milliamps |
| Operating Temperatures | −40 to +80° C. |

The optical receiver service module 22a also includes a monolithic microwave integrated circuit (MMIC) amplifier (not shown) that amplifies the electrical signal to a radio frequency output of approximately +6 dBmV. A preferred MMIC amplifier can be obtained from Hewlett Packard Company of (San Jose, Calif.) under the designation MAV-11. As one of ordinary skill in the art will appreciate, the optical receiver service module 22a may also use a conventional amplifier to amplify the electrical signal.

The optical receiver service module 22a preferably includes a removable physical contact optical connector 72 to connect the PIN-FET photodetector to the fiber optic cable. The physical contact optical connector 72 is preferable because it provides a low return loss while allowing the optical receiver service module 22a to be quickly disconnected from the fiber optic cable. A preferable physical contact optical connector 72 can be obtained from Siecor Corporation (Orlando, Fla.) under the designation FC-PC.

Once the optical receiver service module 22a converts the communications services into the electrical signal, the electrical signal is separated into the individual communications services. Preferably, the communications services are transmitted in discrete wavelength regions so that the individual communications services can be separated by filtering based upon wavelength. Other conventionally known techniques can be used when the communications services are transmitted in a digital format.

The optical receiver service module 22a also includes separate modular connectors 64 that provide a connection for cables that carry the individual communications services from the utility accessible portion 12 to the test ports 44, 46 in the subscriber accessible portion 14. For example, when the optical receiver service module 22a delivers video signals, the optical receiver service module 22a preferably includes an SMB connector that provides a connection to a coaxial cable.

To assist in monitoring the status of the incoming light signal on the fiber optic cable, the optical receiver service module 22a includes an input signal LED 66 that illuminates to indicate when the light signal drops below a threshold value. Preferably, the input signal LED 66 illuminates when the light signal drops below −10 dBm.

The optical receiver service module 22a also includes a receiver power LED 68 that indicates the power supply is providing electric power within a desired range to power the operation of the PIN-FET photodetector and the MMIC amplifier. Preferably, the receiver power LED illuminates when the electric power is approximately −12 volts.

The optical receiver service module 22a is preferably encased in an outer layer of sheet metal 70. The sheet metal layer 70 protects the components in the optical receiver service module 22a from damage and shields the other components in the universal demarcation point 10 from interference by radio frequency radiation emissions.

The service modules 22 also preferably include an optical transmitter 22b for converting electrical signals into light signals that are transmitted from the universal demarcation point 10 to the utility over fiber optic cables. The electrical signals are preferably converted into light signals using a Fabry-Perot laser (not shown). Variations in the electrical signals cause the laser to vary the current through a light source. The laser is preferably a Fujitsu Lightwave semiconductor, which can be obtained from Fujitsu America, Inc. (Lake Bluff, Ill.) under the designation FLD130C2PL.

The optical transmitter service module 22b has modular connectors 78 that provide a connection to the cables that transmit the communications services from the subscriber. For example, when the optical transmitter service module 22b delivers video signals, the optical transmitter service module 22b preferably includes an SMB connector that provides a connection to a coaxial cable.

The optical transmitter service module 22b preferably includes the capability to transmit several communications services from the subscriber to the utility distribution network over a single fiber optic cable. To facilitate transmitting more than one communications service on the fiber optic cable, the communications services are preferably transmitted at different wavelengths.

Similar to the optical receiver service module 22a, the optical transmitter service module 22b preferably includes a transmitter power LED 74 that indicates the power supply is providing electric power within a desired range to power the operation of the components in the optical transmitter service module 22b. Preferably, the transmitter power LED 74 illuminates when the electric power is approximately −12 volts.

The laser is preferably connected to the fiber optic cable with a removable physical contact optical connector 76. The physical contact optical connector 76 is preferable because it provides a low return loss while allowing the optical transmitter service module 22b to be quickly disconnected from the fiber optic cable. A preferable physical contact optical connector 76 can be obtained from Siecor Corporation (Orlando, Fla.) under the designation FC-PC.

The utility preferably connects the utility distribution network to the universal demarcation point 10 with a hybrid cable 60. The hybrid cable 60 contains a plurality of fiber optic cables and a plurality of copper cables. The number of fiber optic and copper cables is selected based upon the type of communications services that the utility is providing to the subscriber and the number and type of service modules 22 in the universal demarcation point 10. When the universal demarcation point 10 is being used with a residential dwelling, the hybrid cable 60 preferably includes four single-mode fiber optic cables and four 16 gauge braided copper cables.

The hybrid cable 60 has a protective coating 86 to protect fiber optic and copper cables from damage. The protective coating 86 is selected based upon where the hybrid cable 60 is installed. For example, a double layer polyethylene jacket with a single armor layer is suitable for protecting the fiber optic and copper cables when the hybrid cable 60 is installed underground. A hybrid cable 60 having the above characteristics can be obtained from AT&T Fitel (Carrollton, Ga.).

When the hybrid cable 60 contains four fiber optic cables, a first fiber optic cable is preferably used to transmit the audio, video, and computer data signals to the subscriber and a second fiber optic cable is preferably used to transmit the audio, video, and computer data signals from the subscriber. A third fiber optic cable and a fourth fiber optic cable are spares that can be used to replace a defective fiber optic cable. In the alternative, the third fiber optic cable can be used to provide a high speed computer data link (greater than 1.5 Mbps) between the subscriber and the utility.

When the hybrid cable 60 contains four 16 gauge braided copper cables, two of the braided copper cables provide electric power for the operation of the components in the universal demarcation point 10. The other two the braided copper cables are preferably used to provide conventional telephone service to the subscriber.

The service modules 22 may also include a control service module 22c. The control service module can be programmed using conventional techniques to perform a variety of tasks in the universal demarcation point 10. For example, the control service module 22c can monitor the operational status of the other service modules 22 and notify the utility if a problem arises. When the control service module 22c is used to modify the other service modules 22, a data path 80 is provided between the service modules.

The control service module 22c can also be programmed to actively control the operation of the other service modules or other utility meters. For example, the control service module 22c can be assigned an identification number, similar to "caller id", that is unique to each subscriber. The identification number allows the utility to remotely monitor each subscriber's usage of utility services, such as natural gas, water, and electricity and then transmit the readings to the utility. By remotely monitoring each subscriber's use of utility services, the utility reduces the costs associated with manually reading the utility meters at the subscriber's dwelling. Remote monitoring systems having the above characteristics are described in Brennan, Jr. et al., U.S. Pat. No.

5,243,338, and Venkataraman et al., U.S. Pat. No. 4,862,493. The identification number also enables the utility to shut off power to the building in the event of a fire or if the subscriber is delinquent in paying for the communications services.

The control service module 22c also preferably includes the ability to monitor when there is unauthorized access to the utility accessible portion 12. The control service module 22c not only notifies the utility that there has been unauthorized access to the utility accessible portion 12 but also preferably stops all transmission of communications services to and from the subscriber until the utility resets the universal demarcation point 10. By stopping all transmission of communications services, the control service module 22c deters subscribers from tampering with the components inside the utility accessible portion 12.

Because the universal demarcation point 10 provides a source for the entry of all or substantially all of the utilities to the building, it provides a central bonding location from which all of the utilities can be grounded. Thus, the possibility of electrical problems resulting from an improper ground are minimized.

The modular construction of the universal demarcation point 10 allows the universal demarcation point 10 to operate in a variety of configurations. Once the universal demarcation point 10 is mounted to the subscriber's dwelling, the universal demarcation point 10 allows the utility to later offer the subscriber additional communications services that would not be feasible without already having access to the subscriber's dwelling.

In the following flow diagrams, each of the components is generally identified as being within the boundaries of the universal demarcation point 10. One of ordinary skill in the art would appreciate that the placement of the components in particular service modules 22 is a design choice based upon the size of the service modules 22 and the desired features of the service modules 22.

Figure 2:
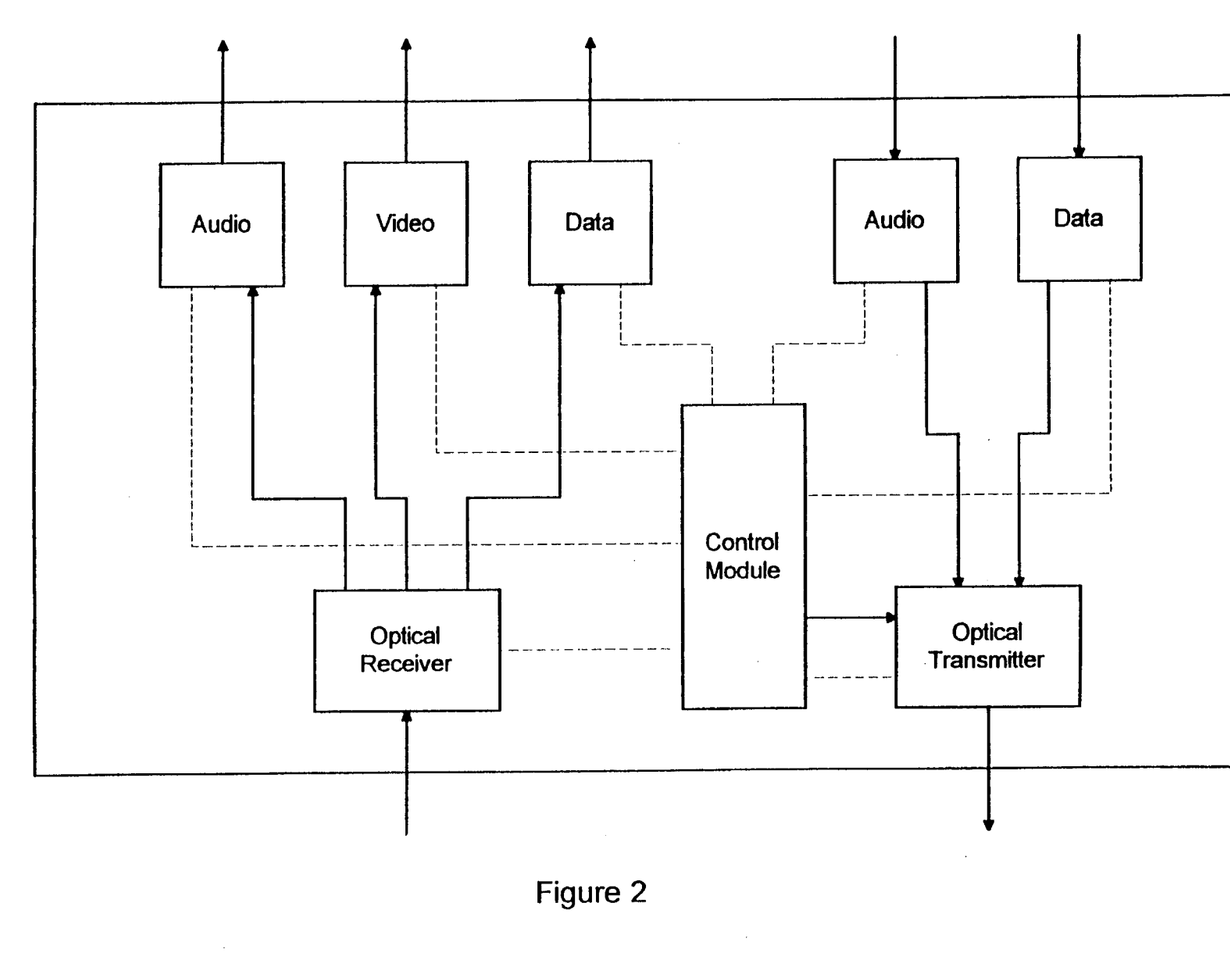
FIG. 2 is a flow diagram illustrating a pathway for communications signals through the universal demarcation point.

The universal demarcation point 10 allows the audio, video, and data signals to be transmitted from the utility distribution network on a fiber optic cable and to the utility distribution network on another single fiber optic cable, as illustrated in FIG. 2.

The incoming light signal is transformed into an electrical signal with an optical receiver. After being converted into an electrical signal, the electrical signal is separated audio, video, and computer data signals based upon differences in the wavelengths that the signals are transmitted at. The separate audio, video, and computer data signals are then transmitted to an audio, video, or computer data output processor, respectively. The audio, video, and computer data output processors convert the signals into a form that can be utilized by the subscriber. For example, the audio signal is preferably transmitted into the subscriber's dwelling using a twisted pair copper cable having RJ-11 connectors and the computer data signal is preferably transmitted into the subscriber's dwelling using either the RS 232 or RS 485 protocols.

This preferred embodiment of the universal demarcation point also includes the capability for transmitting audio, video, and computer data signals from the subscriber. The separate incoming audio, video, and computer data electrical signals are first multiplexed onto a single copper cable based upon the different wavelengths that the signals are transmitted at. The electrical signals are then transmitted using copper cable to an optical transmitter where the electrical signals are converted into light signals that are transmitted through the utility distribution network on a fiber optic cable.

With this preferred embodiment, the operation of each of the components is preferably monitored by a control service module. When the control service module senses that there is an error with one of the components, the control transmits an error message to the utility. The error message is multiplexed with the audio, video, and computer data signals for transmission through the utility distribution network on a fiber optic cable.

Figure 3:
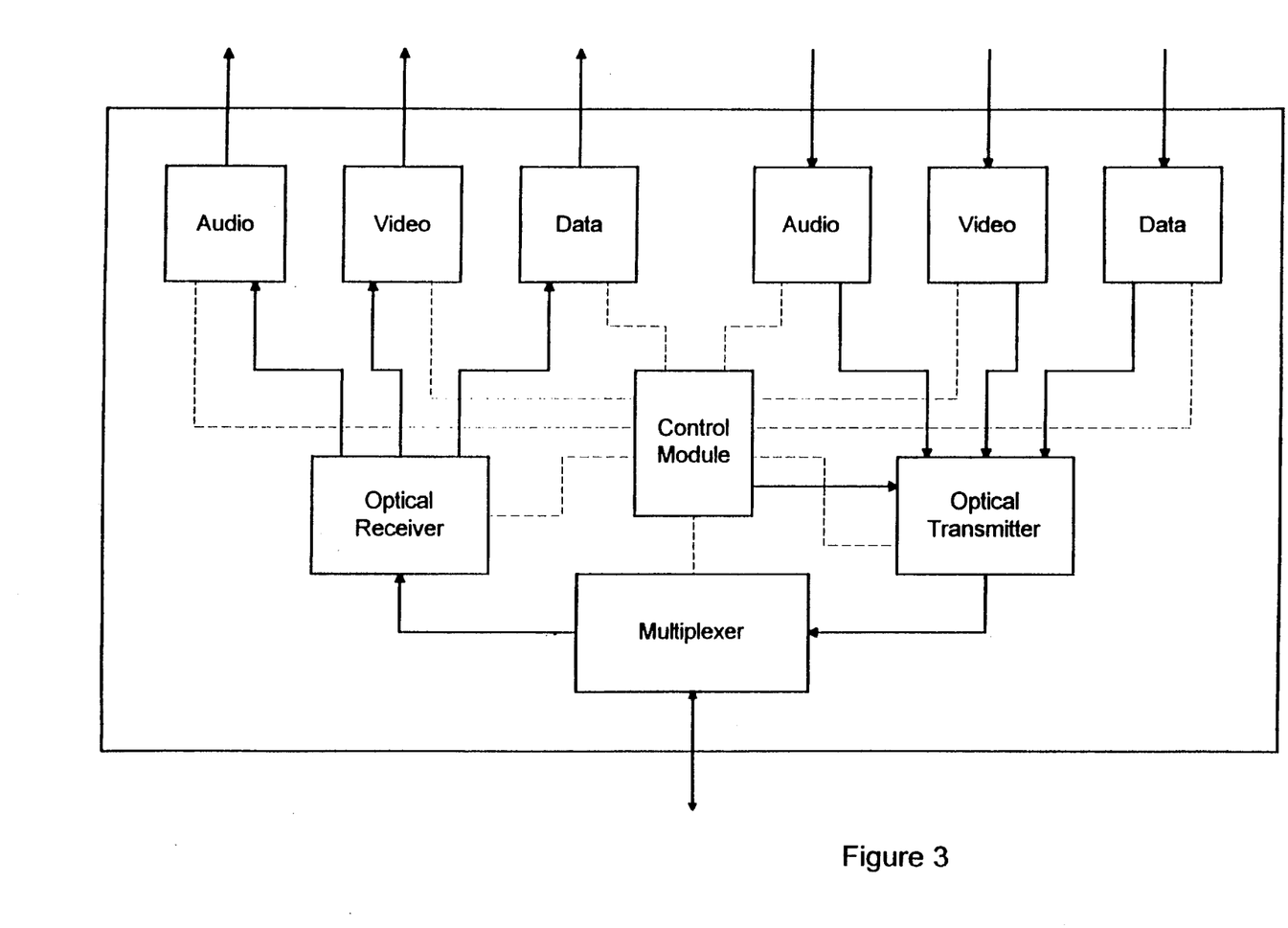
FIG. 3 is a flow diagram illustrating another pathway for communications signals through the universal demarcation point.

The universal demarcation point of the present invention also enables the incoming and outgoing audio, video, and computer data signals to be transmitted on a single fiber optic cable as illustrated in FIG. 3. With this embodiment, the light signal from the utility distribution network is preferably separated from the light signal being transmitted to the utility distribution network using a conventional multiplexer. The conventional multiplexer is preferably obtained from JDS Fitel (Ottawa, Ontario, Canada) under the designation WD-1315X. Then, the incoming light signal is processed similar to the procedure described with reference to the embodiment illustrated in FIG. 2.

After the outgoing audio, video, and computer data signals are converted into light signals as described above with reference to the embodiment illustrated in FIG. 2, the light signals are then transmitted to the utility distribution network by combining the outgoing light signals with the incoming light signals using a conventional multiplexer. Also similar to the embodiment illustrated in FIG. 2, the operation of each of the components in this embodiment is monitored by a control service module.

Figure 4:
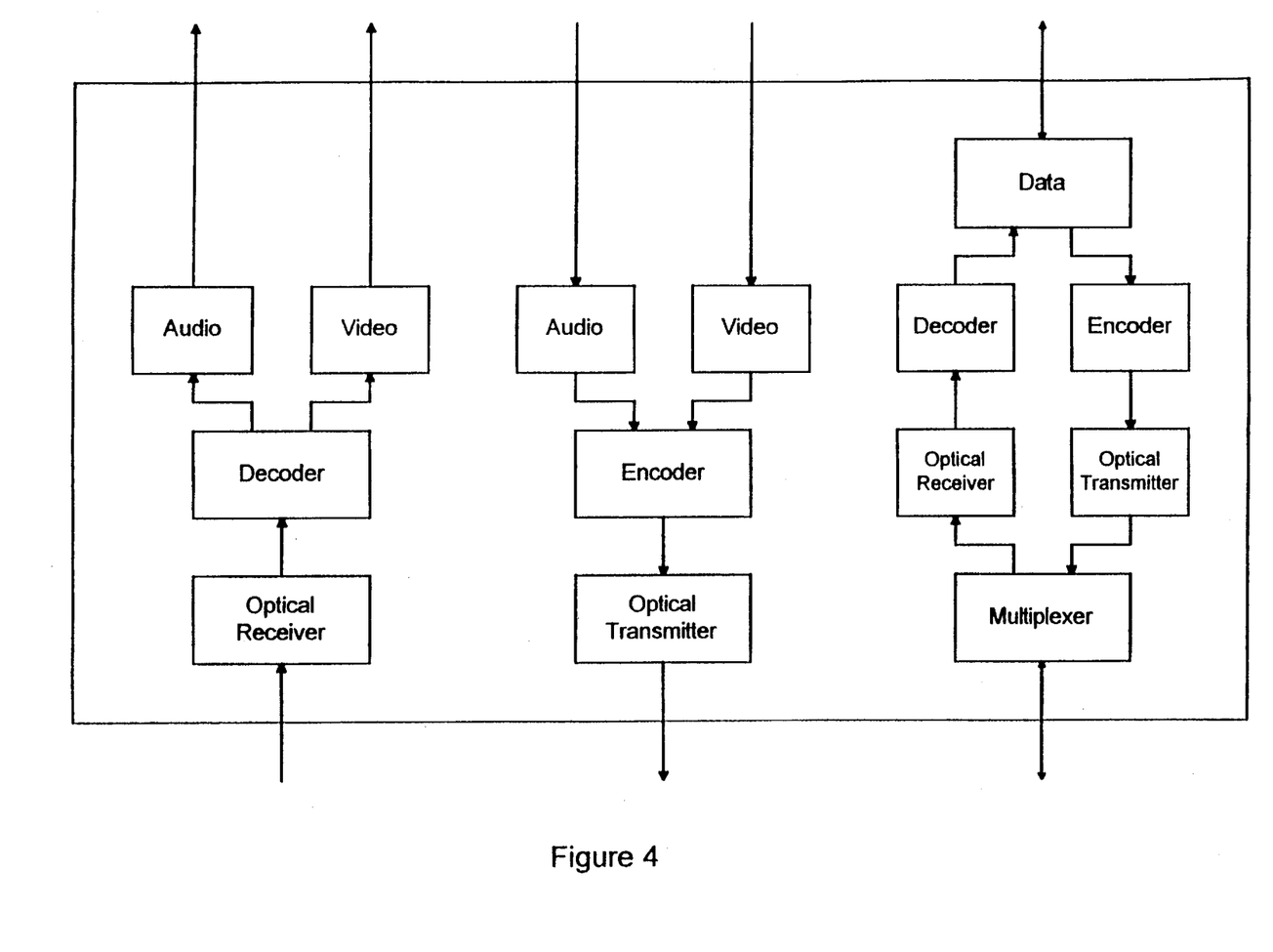
FIG. 4 is a flow diagram illustrating yet another pathway for communications signals through the universal demarcation point.

In yet another embodiment of the universal demarcation point of the present invention illustrated in FIG. 4, incoming audio and video signals are transmitted from the utility distribution network on a first fiber optic cable. This embodiment includes a decoder to decode the communications services from a digital signal. Outgoing audio and video signals are transmitted from the subscriber on a second fiber optic cable. This embodiment also includes an encoder to encode the communications services into a digital signal.

This embodiment also illustrates that both the outgoing and incoming computer data signals are transmitted and received on a third fiber optic cable. By using a separate fiber optic cable to transmit and receive only computer data signals, this embodiment enables the computer data transfer to occur at greater rates than when the computer data signals are combined on a single fiber optic cable with audio or video signals.

Figure 5:
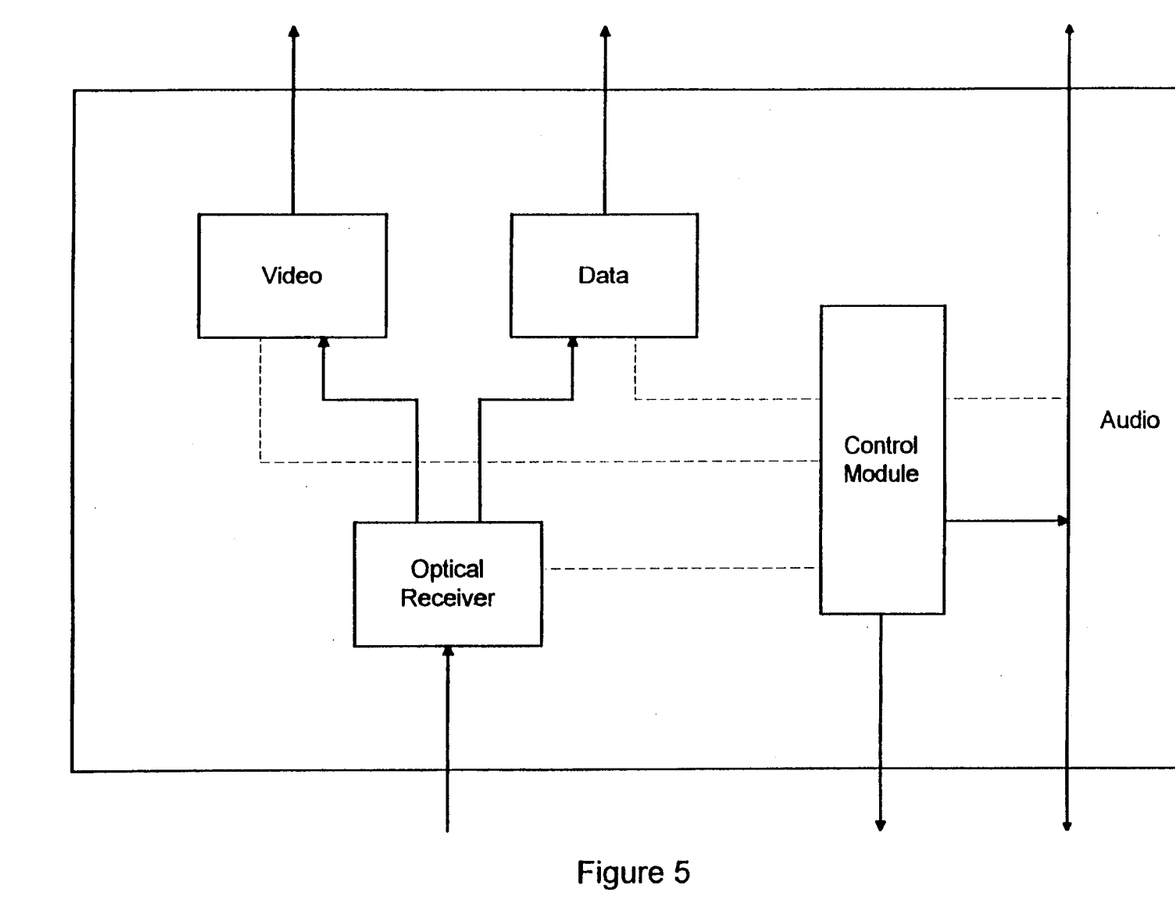
FIG. 5 is a flow diagram illustrating still another pathway for communications signals through the universal demarcation point.

Still another embodiment of the universal demarcation point of the present invention is illustrated in FIG. 5. This embodiment illustrates the universal demarcation point as receiving video and data signals on a fiber optic cable. The optical receiver converts the light signals into an electrical signal. The electrical signal is then separated into individual video and data signals that can be transmitted into the subscriber's dwelling using conventional cables such as twisted pair copper conductors or coaxial cable.

To reduce the cost of manufacturing the universal demarcation point with an optical transmitter as well as an optical receiver, the universal demarcation point accepts audio signals on a twisted pair copper cable. However, it is noted that the modular construction of the universal demarcation point allows the utility to later upgrade the universal demarcation point to include the incoming and outgoing audio signals on the fiber optic cables.

Figure 6:
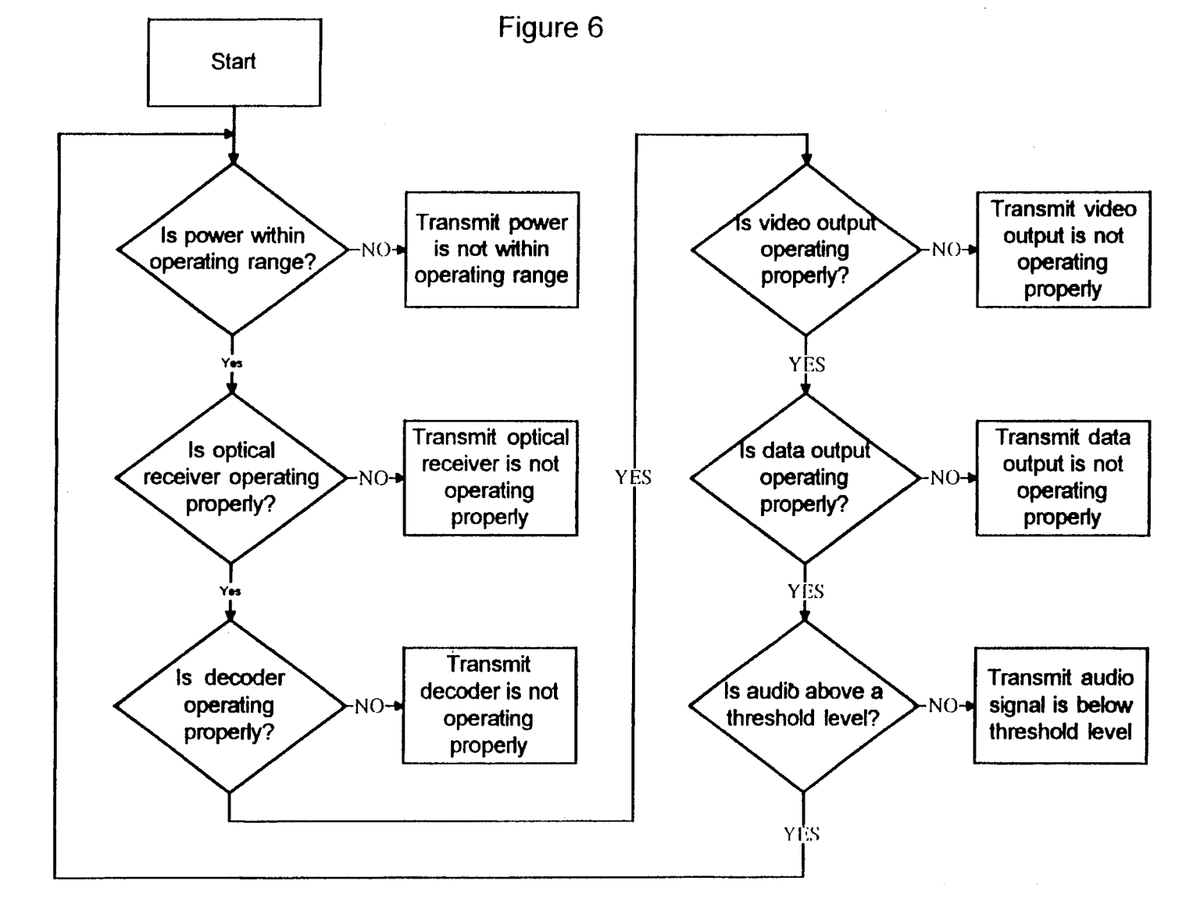
FIG. 6 is a logic flow diagram for a control service module.

The operational status of the components in the universal demarcation point are monitored with the control service module, illustrated at 22c in FIG. 1. The logic followed in one embodiment of the control service module is set forth in FIG. 6. The control service module begins each cycle by sensing whether the power supply is providing electric power within a specified operating range. If the electric power is not within the operating range, the control service module sends an error message to the utility indicating the error. The control service module then monitors the operation of the optical receiver, the decoder, the video output unit, the data output unit, and the audio transmission level. If any of these values are not satisfactory, the control service module transmits a corresponding error message to the utility. The monitoring process is continually repeated while the universal demarcation point remains connected to the utility distribution network.

Figure 7:
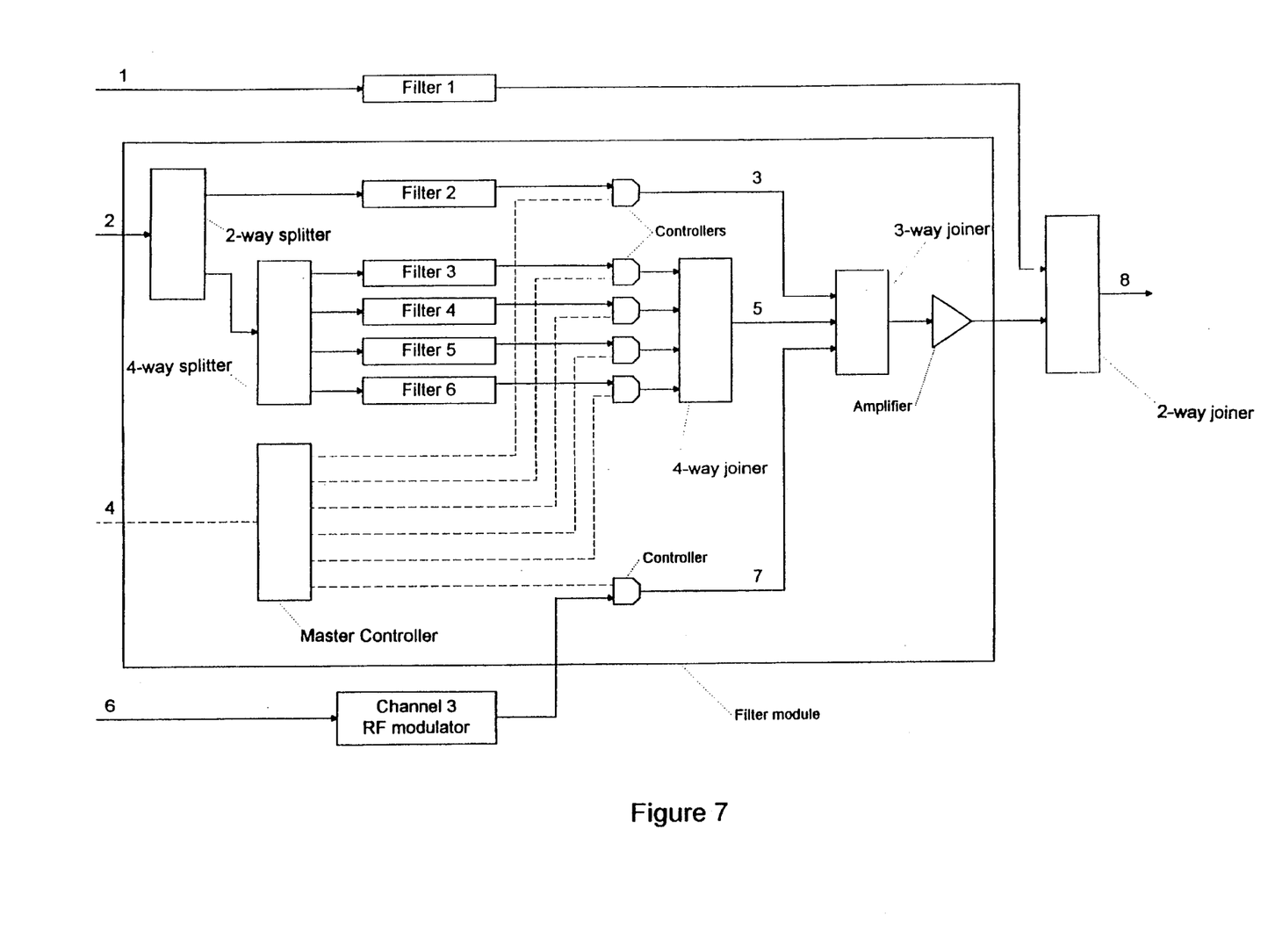
FIG. 7 is a flow diagram illustrating a pathway for video signals through a filter module.

The universal demarcation point may also include a filter module, such as is illustrated in FIG. 7. The filter module enables the utility to control the channels that the subscriber is able to view. The filter module enables the utility to transmit unscrambled video signals through the utility distribution network. By transmitting unscrambled video signals through the utility distribution network, the utility is able to provide higher quality video signals to the subscribers. Because the video signals are transmitted from the utility distribution network on fiber optic cable, which is difficult for unauthorized users to tap into, it is not necessary for the utility to transmit scrambled video signals.

Prior to entering the filter module, the video signal is preferably split into two lines (lines 1, 2). Line 1 is directed through filter 1 where the video signal is filtered so that only the off-air video signals remain on line 1. Alternatively, the off-air video signals can be obtained from a separate source such as an antenna or a satellite dish.

Line 2 is directed into the filter module where the video signal is filtered to produce video signals that the utility restricts access to based upon the services that the subscriber pays for. By restricting access to certain services, the utility is able to charge the subscriber additional fees to receive the services.

Line 2 is preferably split into a plurality of lines. Each of the lines is filtered so that only a desired portion of the video signal remains on the lines. After each video signal is filtered, each video signal passes through a controller. The controller either allows the video signal to pass through or blocks the video signal based upon whether the subscriber has paid for the desired channel. For example, the video signals can be divided into basic cable television services, premium channels, and pay per view channels.

The operation of each of the controllers is controlled by a control signal (line 4) from the control service module. The control signal passes through the master controller where the control signal is directed to the appropriate controller.

The master controller may also transmit a signal to a controller in the off-air video signals lines (not shown) so that a portion of the off-air video signals are blocked when the subscriber is receiving a premium channel or a pay per view channel. By transmitting more than one video signal on each channel the utility is able to increase its ability to offer subscribers a greater variety of programming within a given bandwidth.

The filter module also preferably include system services video and audio signals (line 6). While line 6 indicates that the system services are brought in on a single cable, one of skill in the art will appreciate that separate cables can be used to transmit audio and video signals. When the audio and video signals are transmitted on separate cables, a conventional multiplexer is preferably included in the cable to enable each of the signals to be transmitted to the RF modulator. As indicated in FIG. 7, the RF modulator preferably produces a signal that can be viewed by the subscriber on channel 3.

After the system services signal passes through the RF modulator, the system services signal passes through a controller. Similar to the other controllers, the controller is controlled by a signal from the control service module that is transmitted to the controller through the master controller.

Prior to being transmitted out of the filter module, each of the video signals are preferably joined onto a single cable. After being joined onto the single cable, the video signals are preferably amplified using a conventional amplifier. The conventional amplifier returns the video signals to a level that is needed for use by the subscriber.

After the video signals exit the filter module, the video signals are joined with the off-air video signals onto a single cable (line 8). Placing all of the video signals on the single cable allows the subscriber to plug the single cable into the subscriber owned equipment and obtain all of the video services.

Although the present invention has been described with reference to preferred embodiments, workers skilled in the art will recognize that changes may be made in form and detail without departing from the spirit and scope of the invention.

What is claimed is:

1. A universal demarcation point for managing the delivery of communications services to a subscriber by providing an interface between a utility distribution network and subscriber owned equipment, the universal demarcation point comprising:

a utility accessible portion comprising:

an input port in the universal demarcation point for delivering the communications services from the utility distribution network, the communications services being delivered through a hybrid cable having a plurality of fiber optic cables and a plurality of copper cables, the fiber optic cables are capable of transmitting light signals, the copper cables are capable of transmitting electric power;

an output port in the universal demarcation point for delivering the communications services into the subscriber's dwelling;

a plurality of modular connectors fixedly mounted to the universal demarcation point;

a power supply removably mounted to the universal demarcation point, the power supply converting the electric power into a voltage for powering the operation of the universal demarcation point; and a plurality of service modules that are capable of being plugged into the modular connectors, the service modules converting light signals that are transmitted on the fiber optic cables onto cables that are suitable for use in the subscriber's dwelling; and a subscriber accessible portion being adjacent to the utility accessible portion and having ports that enable the subscriber to test the integrity of the communications services delivered from the utility distribution network.

2. The universal demarcation point of claim 1 and further comprising a motherboard that is removably mounted to the universal demarcation point in the utility accessible portion, wherein the plurality of modular connectors are mounted to the motherboard, the motherboard comprising a plurality of conductive traces formed on the motherboard, the conductive traces are capable of transmitting the electric power from the power supply to the service modules.

3. The universal demarcation point of claim 1 wherein the plurality of service modules includes a video service module.

4. The universal demarcation point of claim 3 wherein the video service module includes a receiver for converting light signals into electrical signals and transmitting the electrical signals on a coaxial cable.

5. The universal demarcation point of claim 4 wherein the video service module includes a transmitter for converting electrical signals into light signals and transmitting the light signals on a fiber optic cable.

6. The universal demarcation point of claim 5 wherein the video service module further includes a multiplexer, the multiplexer enabling the light signals that are transmitted by the transmitter and received by the receiver to be carried on a single fiber optic cable.

7. The universal demarcation point of claim 1 wherein the plurality of service modules includes an audio service module.

8. The universal demarcation point of claim 7 wherein the audio service module includes a receiver for converting the light signals into electrical signals and transmitting the electrical signals on twisted pair copper cables.

9. The universal demarcation point of claim 8 wherein the audio service module includes a transmitter for converting electrical signals into light signals and transmitting the light signals on a fiber optic cable.

10. The universal demarcation point of claim 9 wherein the audio service module further includes a multiplexer, the multiplexer enabling the light signals that are transmitted by the transmitter and received by the receiver to be carried on a single fiber optic cable.

11. The universal demarcation point of claim 1 wherein the plurality of service modules includes a computer data service module.

12. The universal demarcation point of claim 11 wherein the computer data service module includes a receiver for converting the light signals into electrical signals and transmitting the electrical signals on computer cable.

13. The universal demarcation point of claim 12 wherein the computer data service module includes a transmitter for converting the electrical signals into light signals and transmitting the light signals on a fiber optic cable.

14. The universal demarcation point of claim 13 wherein the computer data service module further includes a multiplexer, the multiplexer enabling the light signals that are transmitted by the transmitter and received by the receiver to be carried on a single fiber optic cable.

15. The universal demarcation point of claim 1 wherein the plurality of service modules includes a control service module.

16. The universal demarcation point of claim 15 wherein the control service module includes a receiver for receiving signals from a utility meter to monitor the usage of utility services flowing through the utility meter.

17. The universal demarcation point of claim 16 wherein the control service module further includes a transmitter for transmitting signals to the utility meter to control the flow of utility services through the utility meter.

18. The universal demarcation point of claim 15 wherein each of the service modules contains a monitoring port, each of the monitoring ports transmitting signals to the control service module.

19. The universal demarcation point of claim 18 wherein the control service module contains a receiver for receiving the signals from the monitoring ports and a transmitter to transmit the signals over the fiber optic cables.

20. The universal demarcation point of claim 15 and further comprising a grounding terminal that provides a central ground for all utility services delivered through the universal demarcation point.

21. The universal demarcation point of claim 18 wherein the plurality of service modules includes a filter module, the filter module comprising:

a plurality of filters to separate portions of the electrical signals from the video service module; and a plurality of controllers associated with each filter, the controllers being in communication with the control service module to block portions of the electrical signals from transmission to the subscriber owned equipment.

* * * * *